(12) United States Patent
Korst et al.

(10) Patent No.: US 6,477,541 B1
(45) Date of Patent: Nov. 5, 2002

(54) MULTIMEDIA SERVER

(75) Inventors: Johannes H. M. Korst, Eindhoven (NL); Pascal F. A. Coumans, Geleen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/531,943

(22) Filed: Mar. 21, 2000

(30) Foreign Application Priority Data

Mar. 23, 1999 (EP) .............................................. 99200897

(51) Int. Cl.$^7$ .............................................. G06F 17/30
(52) U.S. Cl. ............................ 707/104.1; 707/2; 707/6; 707/10; 707/101; 710/52; 710/18
(58) Field of Search .................. 707/104.1, 7; 709/231, 709/247; 711/100, 152, 157, 167

(56) References Cited

U.S. PATENT DOCUMENTS 5,586,264 A * 12/1996 Belknap et al. ......... 395/200.08
5,938,734 A *  8/1999 Yao et al. .................... 709/232
6,205,525 B1 *  3/2001 Korst ........................... 711/154

OTHER PUBLICATIONS

Jung–Taek, et al.: A development of an intelligent algorithm for bandwidth allocation in ATM n Petri Nets, Oct. 2001, IEEE, vol. 2, pp. 1131–1136.*

Bunworasate, U., et al., VTDM: a variable bit rate TDM switch architecture for video stream, Dec. 1999, IEEE, vol. 2, pp. 1423–1427.*

J. Korst et al, "Disk Scheduing for Variable–Rate Data Streams", Proceedings European Workshop on Interactive Distributed Multimedia System & Telecommunications Serv., IDMS '97, Darmstadt, Sep. 10–12, 1997 pp. 119–132.

* cited by examiner

Primary Examiner—Diane D. Mizrahi
Assistant Examiner—Jacques Veillard
(74) Attorney, Agent, or Firm—Daniel J. Piotrowski

(57) ABSTRACT

A multimedia server retrieves blocks of data from a storage medium and supplies the blocks in the form of data streams to users. The streams include a group of high bit rate streams and a group of low bit rate streams. The system has a reader for in a sweep reading data blocks from the storage medium for a selected group of streams and for storing the data blocks in respective buffers. The system further has a scheduler for determining which of the streams is to be serviced, i.e. for which of the streams a block is to be read, in the next sweep of the reader. The scheduler according to the invention is operative to determine to service a low bit rate stream less often than a high bit rate stream.

5 Claims, 3 Drawing Sheets

MULTIMEDIA SERVER

Figure 1:
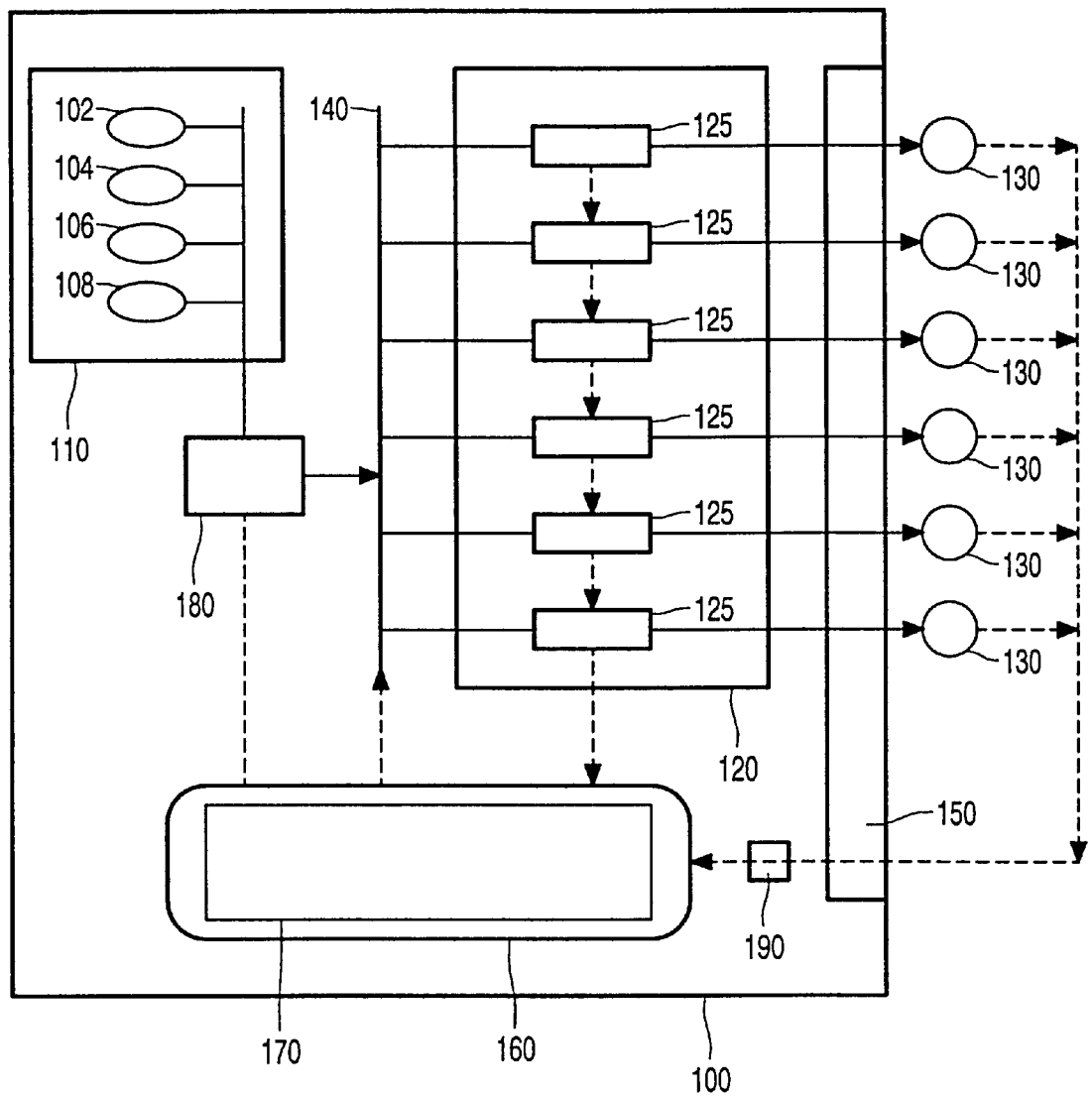

The invention relates to a system for retrieving blocks of data, such as audio and/or video, from a storage medium and supplying the blocks in the form of a plurality of streams to users, wherein a stream of a first class of the streams may have an actual bit rate between a first minimum bit rate and a first maximum bit rate, the first minimum bit rate and the first maximum bit rate potentially being identical thus yielding a constant bit rate, wherein a stream of a second class of the streams may have an actual bit rate between a second minimum bit rate and a second maximum bit rate, the second minimum bit rate and the second maximum bit rate potentially being identical thus yielding a constant bit rate, and wherein the first maximum bit rate is substantially higher than the second maximum bit rate, the system comprising: for each stream an associated buffer for storing the blocks of data; a reader for in a sweep reading a data block from the storage medium for each stream of a selected group of the streams and for storing the read blocks in the respective buffers; and a scheduler for repeatedly selecting the group of the streams for which a block is to be read in a next sweep of the reader.

The invention further relates to a method of retrieving blocks of data, such as audio and/or video, from a storage medium and supplying the blocks in the form of a plurality of streams to users, wherein a stream of a first class of the streams may have an actual bit rate between a first minimum bit rate and a first maximum bit rate, the first minimum bit rate and the first maximum bit rate potentially being identical thus yielding a constant bit rate, wherein a stream of a second class of the streams may have an actual bit rate between a second minimum bit rate and a second maximum bit rate, the second minimum bit rate and the second maximum bit rate potentially being identical thus yielding a constant bit rate, and wherein the first maximum bit rate is substantially higher than the second maximum bit rate, the method comprising the steps of: for each stream storing the blocks of data in an associated buffer; in a sweep reading a data block from the storage medium for each stream of a selected group of the streams and storing the read blocks in the respective buffers; and repeatedly selecting the group of the streams for which a block is to be read in a next sweep.

Such a system and method are described in the paper "Disk scheduling for variable-rate data streams", J. Korst, V. Pronk, and P. Coumans, Proceedings European Workshop on Interactive Distributed Multimedia Systems and Telecommunication Services, IDMS '97, Darmstadt, September 10–12, Lecture Notes in Computer Science, 1309 (1997) 119–132. The known system is a video on demand server, also called multimedia server, which provides a plurality of users with audio and video data, which is stored on the disks of the system. The system repeatedly fetches a block of data for each of the users and stores it in respective buffers, each of which has room for a number of data blocks. The buffers are implemented in relatively fast Random Access Memory. A user consumes data from a corresponding buffer via some communication network at a rate that may vary between zero and a maximum consumption rate. Users may have mutually different maximum consumption rates.

In order to use the disks efficiently, the known system operates in so-called sweeps, also called rounds, whereby blocks are fetched from disk in a single sweeping movement of the disk reading heads. A scheduler determines at the beginning of a sweep which buffers have enough free space for receiving a new block. The scheduler then orders a block of data for these buffers from the disk reader. The size of the buffer of each user is designed in such a way that the buffer does not become empty before actually receiving a new block. The cited paper describes for instance the double buffer algorithm for fixed consumption rates and the triple buffer algorithm for variable consumption rates. In the double buffer algorithm, the buffer can contain two blocks of data and in the triple buffer algorithm, the buffer can contain three blocks of data. A block must contain enough data for a user to consume at a maximum rate during the period of a worst-case sweep. The size of a block of each of the streams must therefore at least be equal to the product of the maximum duration of the sweep and the maximum consumption rate of the respective stream. The duration of a sweep is determined by the actual blocks to be fetched, since each block requires a switch time for locating the block on the disk and a transfer time for actually reading the block from the disk at a given transfer rate. The switch time and the transfer rate are dependent on the specific hard disks used in the system. The transfer time is further dependent on the size of the block to be read, since a larger block will require a longer time to be read. Given the above constraints, the minimum respective block sizes are calculated on the basis of the performance parameters of the hard disks of the system and on the basis of the required maximum number of users to be serviced.

It is an object of the invention to provide a system as described in the preamble in which the total memory required to implement the buffers for the streams is less than in the known system. This object is achieved according to the invention in a system, which is characterized in that the scheduler is operative to select a stream of the second class less often in the group for which a block is to be read than a stream of the first class, such in the situation where the actual bit rate of the stream of the second class equals the second maximum bit rate and the actual bit rate of the stream of the first class equals the first maximum bit rate. So in the steady situation, where both streams are consumed at their respective maximum rates, the stream of the second class, i.e. the one with the smaller consumption rate, is serviced less often. In the context of this description, servicing a stream means that the scheduler verifies whether the buffer of this stream has enough free space to receive a new block and if such is the case, selects this stream into the group for which a block is to be read in the next sweep, and have this block read. As a result of servicing this stream less often, the sweep or sweeps in which the data stream of the second class is not serviced will be shorter. This means that the size of a block for the stream of the first class may be designed smaller because it must contain now at least sufficient data to be consumed during the shorter period of the sweep. The penalty for not servicing the stream of the second class in every sweep is that the size of a block for this stream is to be designed larger, since it must contain enough data to be consumed during a number of sweeps. It can be shown that the decrease of the size of the block for the stream of the first class is larger than the increase of the size of the block for the stream of the second class. Therefore, the sum of the size of the blocks has decreased and the overall memory required for the buffers in the system has decreased. The fact that the sum of the block sizes has decreased is caused by the fact that the consumption rate of the stream of the second class is smaller than the one of the stream of the first class. In the known system, this has the result that the block size for the stream of the second class is relatively small and that the switch time for such a block is relatively large. By servicing the stream of the second class less often, the relative contribution of the switch time becomes smaller and the disk is being used more efficiently.

An embodiment of the system according to the invention is described in claim 2. In the steady situation of this embodiment, a high bit rate stream is serviced every sweep and a low bit rate stream every k sweeps, which provides a simple mechanism to service a low bit rate stream less often than a high bit rate stream. Choosing k in dependence on the respective maximum consumption rates provides a good way of finding a value for k at which the memory required for the buffers is as small as possible.

An embodiment of the system according to the invention is described in claim 3. Servicing all low bit rate streams in one particular sweep, which is subsequently followed by k−1 sweeps in which none of the low bit rate streams is being serviced, is a simple mechanism for servicing a low bit rate stream less often then a high bit rate stream.

An embodiment of the system according to the invention is described in claim 4. Evenly distributing the servicing of the low bit rate streams over the sweeps gives a further reduction of the amount of memory required for the buffers. This is because the switching overhead for the low bit rate streams is no longer concentrated in one sweep. This concentration leads to a large sweep requiring a larger buffer to contain the amount of data for the high bit rate streams consumed during this sweep. By spreading the overhead over all sweeps, each sweep is increased slightly but their individual duration is shorter than the duration of the large sweep. This means that the buffers for the high bit rate streams may be chosen smaller.

It is a further object of the invention to provide a method as described in the preamble in which the total memory for buffering the blocks of the streams is less than in the known system. This object is achieved according to the invention in a method, which is characterized in that a stream of the second class is selected less often in the group for which a block is to be read than a stream of the first class, such in the situation where the actual bit rate of the stream of the second class equals the second maximum bit rate and the actual bit rate of the stream of the first class equals the first maximum bit rate.

Figure 2:
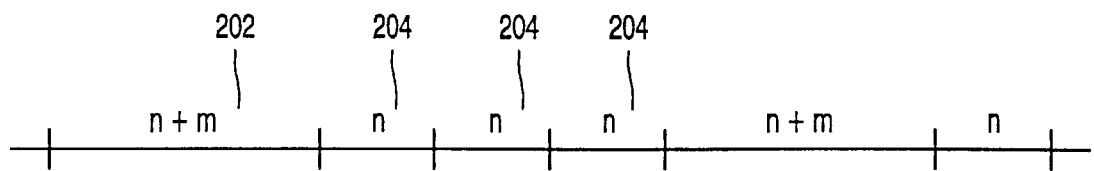
Figure 3:
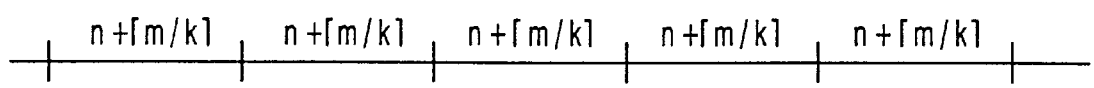
Figure 5:
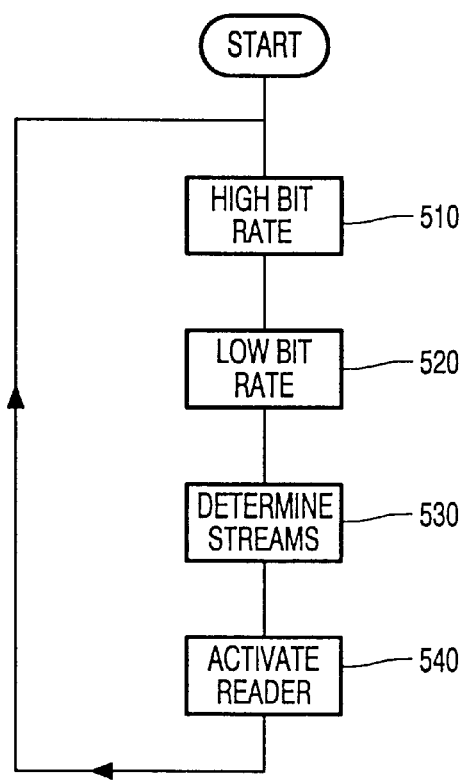
Figure 4:
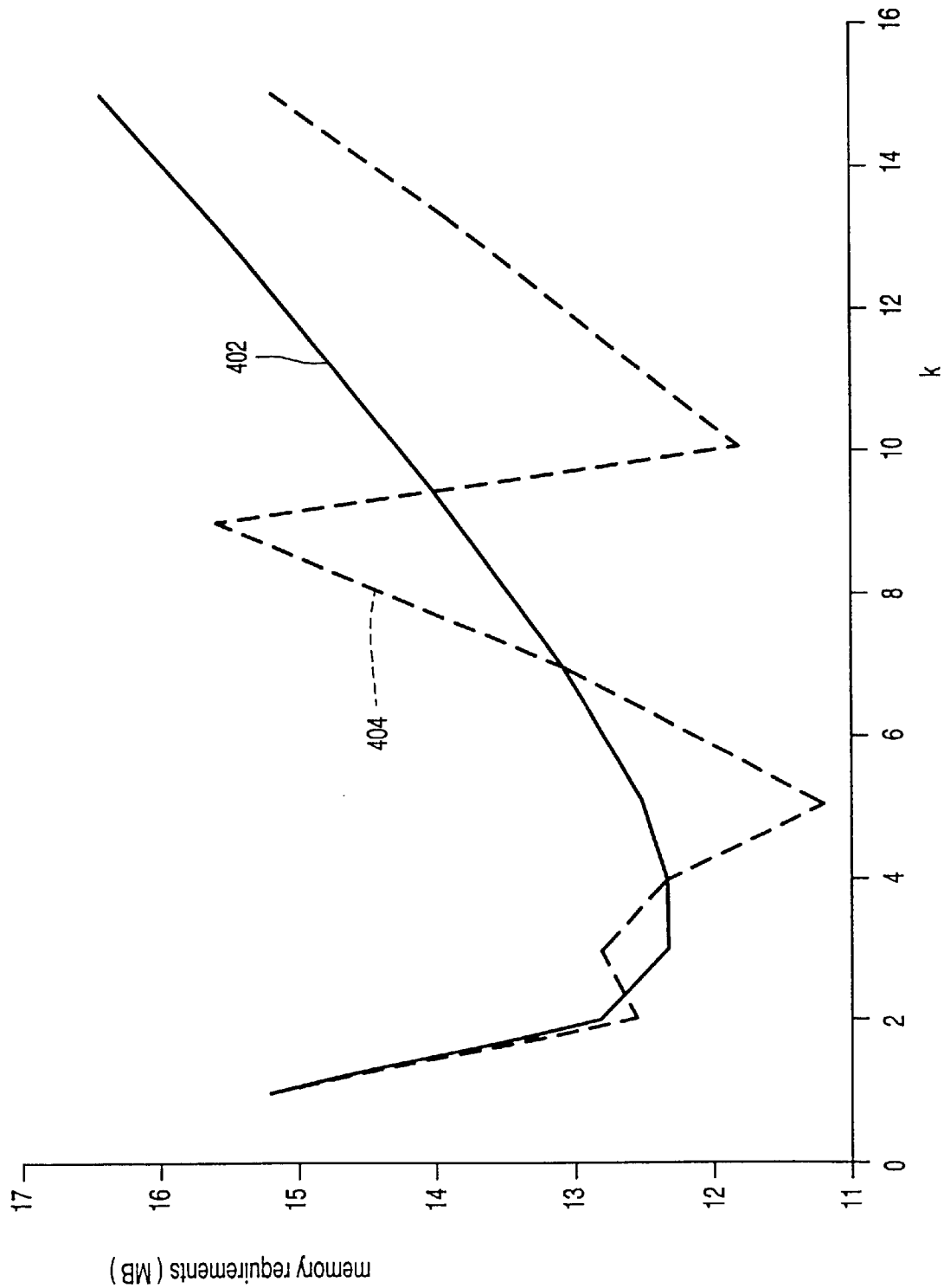

The invention and its attendant advantages will be further elucidated with the aid of exemplary embodiments and the accompanying schematic drawings, wherein:

FIG. 1 schematically shows a block diagram of a system 100 according to the invention, FIG. 2 shows an overview of the sweeps over time in the first embodiment of the system according to the invention, FIG. 3 shows an overview of the sweeps over time in the second embodiment of the system according to the invention, FIG. 4 shows the memory requirements of the first and the second embodiment for different values of k, and FIG. 5 shows a flow chart of the operation of the scheduler.

FIG. 1 schematically shows a block diagram of a system 100 according to the invention. An example of such a system 100 is a multimedia server. Multimedia applications can be characterized by an extensive use of audio-visual material. For the playback of audio or video a (near-)continuous supply of audio/video data is required. Known examples of a multimedia server include a near-video-on-demand server and a video-on-demand server. In a near-video-on-demand system the service provider determines when a title is reproduced. A data stream containing the data of the title may be received by many users simultaneously. In a video-on-demand system, typically the user selects a title and controls, with VCR-like controls, the reproduction of the title. The level of interaction is higher and a data stream is typically only consumed by one user. A multimedia server is usually implemented using a file server which is specifically designed to supply continuous data streams for a large number of users in parallel. Usually, one or more multimedia titles are stored on a background storage medium 110. At this moment, normally disks, such as hard disks, are used as the background storage medium 110, based on their large storage capacity at low cost and the possibility of random access. It will be appreciated that also other storage media, such as optical disks, tape, or even solid state memory may be used. The storage medium 110 may be divided into a plurality of storage units (shown are 102, 104, 106 and 108). As such, the storage medium 110 may be formed by a cluster of storage units, such as a RAID system. The storage unit, such as a hard disk, may itself be further subdivided (resulting in a hierarchical cluster). For a typical video-on-demand system, which uses disk-based storage media, the number of storage units forming the storage medium 110 is usually determined by the required bandwidth. The data streams are bounded by a maximum consumption rate of $c^{max}$ data elements per second, where a data element may for instance be a byte. Different streams may have different maximum consumption rate depending on the contents of the reproduced material, e.g. an audio stream has a far lower maximum consumption rate than a video stream. For variable bit-rate encoded MPEG-2 material the maximum consumption rate will typically be chosen to be between approximately 2 or 15 Mbit/sec, depending on the desired quality. In many systems, the data blocks are striped over all or a group of disks. A request for a data block results then in a disk access to all (or the group of) disks in the array. For the purpose of this description it is assumed that the storage medium 110 is formed by one storage unit with a suitably high bandwidth and/or storage capacity (whereas actually more than one storage unit may be used). It will be appreciated that in practice the maximum consumption rate for some data streams may be lower, for instance if the corresponding title is of a lower quality or a different type (e.g. audio, whereas most streams relate to a combination of audio and video) than a worse case situation for which the system usually is designed.

The system 100 comprises a reader 180 for reading data from the storage medium 110. The reader 180 may, for instance, be implemented using a SCSI interface. Advantageously, the storage medium 110 is also included in the system 100. For a disk oriented storage medium 110, data is retrieved in units of a Disk Access Block (DAB), where a DAB is formed by a sequence of consecutive sectors. Typically, DABs which are successively read from a same disk are not stored contiguously on the disk. Usually, DABs which are successively read from the same disk belong to different files (where a file is the collection of blocks belonging to one title) since the disk has to supply DABs for a plurality of data streams in some interleaved manner. Even if DABs which are to be read successively belong to the same file, successive blocks of a file need not be stored contiguously in one storage unit but can be distributed over the storage unit or even over several storage units of the storage medium 110. As a consequence of reading non-contiguous DABs, the disk head needs to be moved in between reading of a DAB and the appropriate starting point of the next DAB has to be awaited. Such a switch can take a considerable time, during which no data can be read. To reduce the switching overhead, the so-called disk sweeping technique is frequently used. In such a scheme, the reader 180 is able to read a number, of for instance eight DABs, from the storage unit 110 in one batch.

The DABs of the batch are ordered based on their physical track position. For the read operation, the disk head is moved in only one direction (e.g. from the inner edge to the outer edge or vice versa), only stopping to read the DABs of the batch. In this way, the switching overhead is reduced significantly. Advantageously, a reader 180 is used which accepts a batch of read requests and internally performs the necessary scheduling of the requested read operations in order to perform the most optimal sweep for the specific disk. The reader 180 may also include a caching memory for temporarily storing data read from the disk before supplying the data, potentially in a different sequence than read from disk, via a bus 140 to the remainder of the system 100. It will be appreciated that the role of the reader 180, such as controlling the reading, arranging a sweeping sequence and caching read data, may also be distributed, where each of the storage units has its own controller performing these functions. If so, a main task of the reader 180 is to co-ordinate the operations of the various control units.

Particularly for video, a data stream may be very voluminous. To reduce the volume, typically, compression techniques are used. The compression scheme may result in a fixed rate data stream, for instance using a fixed rate form of MPEG-1 encoding, or a variable rate data stream, for instance using a variable rate form of MPEG-2 encoding. The system according to the invention may be used for fixed rate systems as well as variable rate systems. For variable data rate streams a fixed maximum consumption rate of $c^{max}$ data elements per second may be given, which rate may be different for different streams and which is used for dimensioning the system (e.g. bandwidth of the system and/or size of storage) in order to ensure that the system still operates in a worst case situation (e.g. when all data streams consume data at the maximum data rate). With respect to the maximum consumption rate, the system according to the invention has at least two classes of data streams, each with its own maximum consumption rate. For example, one class includes audio streams and the other class includes video streams. Normally, the data is stored in the storage medium 110 and processed by the system 100 in a compressed form. Only at the user 130 the data stream is decompressed, using a decoder. Particularly for a variable rate system, the system 100 may also be able to support VCR-like control functions. A data stream may be in one of a plurality of states like an active and a new/halted state, where an active data stream may supply data to a user (i.e. the user may consume data) and a new or halted data stream may (currently) not supply data to a user (i.e. no sufficient data is present for consumption by a user without running the risk that underflow of the corresponding buffer occurs). Typically, if a user temporarily stops consuming data, the stream stays active. If the user switches stream (e.g. explicitly selects a new title or implicitly is provided with a new stream by, for instance, instructing the system to play in fast forward mode which results in selecting a new stream with the same title being displayed fast), the stream is temporarily halted allowing for new data to be loaded. It will be appreciated that a slow motion function may be implemented by consuming data at a low rate (the stream remains active) or switching to a new stream (the stream is temporarily halted). The system 100 maintains for the data stream a stream status which indicates the current state. The stream status for one or more data streams may be stored in a status memory 190, such as the main memory (RAM) of the server or special registers.

Data is read from the storage medium 110 for a batch of data streams where the data of the batch is supplied as a time multiplexed stream via the bus 140. The storage medium 110 is not capable of simultaneously supplying continuous data streams to all users of the system. Instead, data for a subset of data streams is read and supplied to the remainder of the system 100 at a higher data rate then consumed by the corresponding data streams. The system 100, therefore, comprises buffers 125 for achieving supply of data at the required rate to the users 130. Usually, the buffers 125 are implemented using RAM in a part 120 of the system's memory. The system 100 further comprises communication means 150 for transferring data of the data streams to users. The communication means 150 may be formed by any suitable means, such as a local area network, for supplying the data to users located near the system 100. In practice, a telecommunication or cable network is used for supplying the data over a longer distance.

The system 100 also comprises a control unit 160 for controlling the system 100. A main part of the control unit is formed by the scheduler 170, which determines which DABs should be read by the reader 180 from the storage medium 110 in order to avoid that an underflow or overflow of the buffers 125 occurs. The control unit is typically formed by a processor, such as a RISC-, or CISC-type microprocessor, which is operated under control of a real-time operating system, loaded from a storage medium, such as ROM or a hard disk. The scheduler 170 may be implemented as a software module integrated into the operating system or loaded as an application program. Typically, the scheduler 170 receives status information, such as a filling degree of the buffers, upon which the scheduler 170 bases its decision. For systems which offer VCR-like controls, the scheduler also receives information regarding the status of a stream. In such systems, typically, control information is received from the users 130 via the communication means 150.

Data is stored in concentric circles, called tracks, on the disk. Each track consists of an integer number of sectors. Tracks near the outer edge of a disk may contain more sectors than tracks near the inner edge. For this purpose, modem disks arrange the set of tracks in non-overlapping zones, where the tracks in a zone have the same number of sectors and different zones correspond to different number of sectors per track. Typically, a disk rotates at a constant angular velocity, so that reading from tracks in a zone near the outer edge results in a higher data transfer rate than reading from tracks in a zone near the inner edge. The time required for accessing data from the disk is mainly determined by:

a seek time, i.e. the time needed to move the reading head to the desired track, a rotational latency, i.e. the time that passes before the required data moves under the reading head once the track has been reached, and a read time, i.e. the time needed to actually read the data.

The sum of the seek time and the rotational latency is referred to as switch time.

The read time depends on the amount of data to be read and the radial position of the track(s) on which the data is stored. The rotational latency per access takes at most one revolution of the disk. The seek time per access is maximal if the reading head has to be moved from the inner edge to the outer edge of the disk, or vice versa. To avoid that such a maximum seek has to be taken into account for each access, disk accesses are handled in batches, called a sweep. As the head moves from the inner edge to the outer edge, or vice versa, the required data blocks are read in the order in which they are encountered on disk. The total seek time that is required to execute a sweep with j accesses has been shown to be maximal when all j seeks cross an equal number of tracks. For the purpose of the description, it is assumed that the storage medium is characterized by a guaranteed data transfer rate r and a switch time function s(l). The switch time function s(l) gives the time that is maximally spent on switching when l data blocks have to be retrieved in a single sweep. The data transfer rate r gives the minimum guaranteed rate at which data can be read. To avoid that this data rate has to be based on the data rate of the inner tracks of a disk, track pairing may be used where, for instance, a block which is striped over all disks of the array. In such a case, data for the block to be read from a track i of one disk is paired with reading data from a track $tr^{max}-i+1$, $1 \leq i \leq tr^{max}$, of another disk, where $tr^{max}$ denotes the maximum number of tracks. In this way r can be given by d times the average rate of a single disk, where d denotes the number of disks in the array.

In the embodiments and the comparisons with the prior art given below, a particular implementation of a video-on-demand server is used. This server has a maximum of n high bit rate streams and m low bit rate streams. The high bit rate streams have a fixed bit rate $c_h$ and the low bit rate streams have a fixed bit rate $c_l$. The double buffer algorithm is used as described in the paper "Disk scheduling for variable-rate data streams", J. Korst, V. Pronk, and P. Coumans, Proceedings European Workshop on Interactive Distributed Multimedia Systems and Telecommunication Services, IDMS '97, Darmstadt, September 10–12, Lecture Notes in Computer Science, 1309 (1997) 119–132. This implementation is an example and the invention can be applied in other systems as well, e.g. for more than two levels of bit rate, for variable bit rates and for a different buffering algorithm.

In the prior art, the streams are serviced in strictly periodic sweep, where the duration of a sweep is large enough to retrieve a block for each of the streams. The size of a block for a stream is exactly the amount of data that is consumed during a sweep. A data block retrieved in sweep i is consumed in sweep i+1. The constraints for the block size $B_h$ for the high bit rate streams and the block size $B_l$ for the low bit rate streams are given by the following equations:

$$\frac{B_h}{c_h} \geq \frac{nB_h + mB_l}{r} + s(n+m) \quad (1)$$

$$\frac{B_l}{c_l} \geq \frac{nB_h + mB_l}{r} + s(n+m) \quad (2)$$

Wherein:
n is the number of high bit rate streams,
$c_h$ is the consumption rate of the high bit rate streams,
m is the number of low bit rate stream,
$c_l$ is the consumption rate of the low bit rate streams,
r is the minimal guaranteed transfer of the disk, and
s(x) is the worst case switch time for retrieving x data blocks in one sweep.

Solving these equations for the minimal $B_h$ and $B_l$ results in:

$$B_h = \frac{rc_h s(n+m)}{r - nc_h - mc_l} \quad (3)$$

$$B_l = \frac{c_l}{c_h} B_h \quad (4)$$

Hence, the block sizes are chosen proportional to the respective consumption rates. The total memory requirements for the buffers in this prior art system are given by:

$$2nB_h + 2mB_l \quad (5)$$

According to the invention, a low bit rate stream is no longer serviced in every sweep. In a first embodiment, a low bit rate stream is serviced only once every k sweeps and all low bit rate streams are serviced in the same sweeps. FIG. 2 shows an overview of the sweeps over time in the first embodiment of the system according to the invention. There is a large sweep 202, in which the n high bit rate streams and the m low bit rate streams are serviced. The large sweep 202 is followed by k−1 small sweeps 204. In a small sweep only the n high bit rate streams are serviced. After the k−1 small sweeps, a large sweep is carried out servicing the n high bit rate streams and the m low bit rate streams. In the example of FIG. 2, k equals 4, but it will be clear that other values may be chosen. The size $B_l$ of a block for a low bit rate stream is chosen large enough to contain enough data for consumption at the rate $c_l$ for k successive sweeps, which are k−1 small sweeps and 1 large sweep. The size $B_h$ of a block for a high bit rate stream is chosen large enough that k of these block would contain enough data for consumption at a rate $c_h$ during k successive sweeps, which are k−1 small sweeps and 1 large sweep. Furthermore, $B_h'$ is the amount of data consumed at a rate $c_h$ during a large sweep. The constraints for the block size $B_h$ for the high bit rate streams, for the block size $B_l$ for the low bit rate streams and for the amount of data $B_h'$ are given by the following equations:

$$\frac{kB_h}{c_h} \geq \frac{(k-1)nB_h + nB_h + mB_l}{r} + (k-1)s(n) + s(n+m) \quad (6)$$

$$B_l = \frac{c_l k B_h}{c_h} \quad (7)$$

$$\frac{B_h}{c_h} \geq \frac{nB_h + mB_l}{r} + s(n+m) \quad (8)$$

Wherein:
n is the number of high bit rate streams,
$c_h$ is the consumption rate of the high bit rate streams,
m is the number of low bit rate stream,
$c_l$ is the consumption rate of the low bit rate streams,
r is the minimal guaranteed transfer of the disk,
s(x) is the worst case switch time for retrieving x data blocks in one sweep, and
k is the period of servicing a low bit rate stream, denoted in sweeps.

Solving these equations for the minimal $B_h$, $B_l$ and $B_h'$ results in:

$$B_h = \frac{rc_h((k-1)s(n) + s(n+m))}{kr - knc_h - kmc_l} \quad (9)$$

$$B_l = \frac{c_l k B_h}{c_h} \quad (10)$$

$$B_h' = \frac{B_h(c_h n + mkc_l)}{r} + c_h s(n+m) \quad (11)$$

The memory requirements for the buffers of the high bit rate streams in this embodiment are given by:

$$n(B_h + B_h') \quad (12)$$

The memory requirements for the buffers of the low bit rate streams in this embodiment are given by:

$$m \cdot \frac{(k+1)}{k} B_l \quad (13)$$

The total memory requirements for the buffers in this embodiment is given by the sum of equations (12) and (13). Different values of k result in different amounts of memory required for the buffers. Below, a numerical example is given for this embodiment.

It is to be noted that in this embodiment with fixed consumption rates, a block is read for a high bit rate stream in each sweep. This block contains more data than the amount of data consumed in a small sweep and less data than consumed in a large sweep. So during the k−1 small sweeps, a certain amount of data is saved up in the corresponding buffer. This amount is sufficient to be consumed in the period which equals the difference between the large sweep and the small sweep. Or in other words, this amount of saved data together with the block read in the previous sweep is enough to be consumed during a large sweep.

In a second embodiment, a low bit rate stream is also serviced only once every k sweeps, but reading blocks for the low bit rate streams is now evenly distributed over the k sweeps. FIG. 3 shows an overview of the sweeps over time in the second embodiment of the system according to the invention. In each sweep, the n high bit rate streams are serviced and a fraction of the m low bit rate streams. After a particular low bit rate stream has been serviced in a given sweep, that stream is not serviced in the next k−1 sweeps but in the sweep following those k−1 sweeps. To evenly distribute the reading of the low bit rate streams over the sweep, a fraction of mrk low bit rate streams is serviced in each sweep. If the expression m/k does not yield an integer value, it is rounded up to next higher integer value. The results of this rounding up is shown as $\lceil m/k \rceil$.

In this second embodiment, in each sweep n blocks of size $B_h$ for the high bit rate streams and at most $\lceil m/k \rceil$ blocks of size $B_l$ for the low bit rate streams are read. The constraints for the block size $B_h$ and for the block size $B_l$ are given by the following equations:

$$\frac{B_h}{c_h} \geq \frac{nB_h + \lceil \frac{m}{k} \rceil B_l}{r} + s\left(n + \lceil \frac{m}{k} \rceil\right) \quad (14)$$

$$B_l = \frac{c_l k B_h}{c_h} \quad (15)$$

Wherein:
n is the number of high bit rate streams,
$c_h$ is the consumption rate of the high bit rate streams,
m is the number of low bit rate stream,
$c_l$ is the consumption rate of the low bit rate streams,
r is the minimal guaranteed transfer of the disk,
s(x) is the worst case switch time for retrieving x data blocks in a single sweep, and
k is the period of servicing a low bit rate stream, denoted in sweeps.

Solving these equations for the minimal $B_h$ and $B_l$ results in:

$$B_h = \frac{rc_h s\left(n + \lceil \frac{m}{k} \rceil\right)}{r - nc_h - k\lceil \frac{m}{k} \rceil c_l} \quad (16)$$

$$B_l = \frac{c_l k B_h}{c_h} \quad (17)$$

The total memory requirements for the buffers in this second embodiment are given by the following equation:

$$\frac{m(k+1)}{k} B_l + 2nB_h \quad (18)$$

FIG. 4 shows the memory requirements of the first and the second embodiment for different values of k. The equations as given above for the first and second embodiment are used for the calculations. The disk parameters of this numerical example are:
minimum transfer rate: 75 Mbit/s
worst case rotational latency: 6 ms
worst case seek time: 16.6 ms
There are 10 high bit rate streams with a consumption rate of 5.625 Mbit/s and 10 low bit rate streams with a consumption rate of 0.375 Mbit/s. Line 402 indicates the total amount of memory required for the buffers of the first embodiment for different values of k. Line 404 indicates the total amount of memory required for the buffers of the second embodiment for different values of k. The value of k runs from k=1 until k=15. At k=1, the low bit rate streams are serviced every sweep which corresponds with the prior art system. As shown by FIG. 4, the buffers of that system require approximately 15.2 Mbyte of memory. Choosing k=4 gives an optimal value for the first embodiment, at which approximately 12.3 Mbyte of memory is required for the buffers. This gives a saving of approximately 20% compared with the prior art system. In the second embodiment, choosing k=4 gives the optimal value. Then approximately 11.2 Mbyte are required for the buffers, saving approximately 26% over the prior art system. The irregular path of trace 404 is caused by the effects of the rounding $\lceil m/k \rceil$, which may result in a less effective algorithm for some values of k, e.g. k=9.

The second embodiment can be improved by explicitly introducing sweeps in which $\lceil m/k \rceil$ low bit rate streams are serviced and sweeps in which $\lfloor m/k \rfloor$ low bit rate streams are serviced. The expression $\lfloor m/k \rfloor$ indicates the rounding down of the expression m/k if the latter does not yield an integer value. By introducing those two kinds of sweep, the memory requirements for the buffers vary more smoothly for increasing values of k, potentially resulting in a smaller minimum.

FIG. 5 shows a flow chart of the operation of the scheduler. The scheduler 170 controls reading of blocks from the storage medium 110. The scheduler operates in a cyclical manner. At the beginning of each cycle, the scheduler 170 in step 510 determines how many high bit rate streams are active at that moment. Then in step 520, the scheduler determines which of the low bit rate streams are to be serviced. When applied in the first embodiment, the scheduler determines whether this cycle is a small sweep or a large sweep. If it is a small sweep, none of the low bit rate streams must be serviced and if it is a large sweep all of the currently active low bit rate streams must be serviced. When applied in the second embodiment, the scheduler determines the next fraction of at most $\lceil m/k \rceil$ low bit rate streams to be serviced now. To this end, k fractions of at most $\lceil m/k \rceil$ low bit rate streams are defined and each group is selected at its turn in a cyclic manner, thus servicing each group once every k sweeps. Next in step 530, the scheduler 170 assembles the group of data streams for which a block of data needs to be read within this cycle. For variable rate systems, the scheduler 170 may actively check which of the buffers 125 have room for a new block. For a fixed bit rate scheduling algorithm, the scheduler 170 may determine that a new block needs to be read for all selected streams. Next, in step 540 the scheduler 170 causes the reader 180 to read the corresponding blocks (actually, the DABs associated with the blocks) from the storage medium 110. In response to a block read request issued by the scheduler 170, the reader 180 arranges that the corresponding block is read from the storage medium 110. The read block is stored in one of the buffers 125 which corresponds to the data stream for which the block is read. The data is supplied from that buffer to a user. After the reader 180 has substantially read the data blocks, the scheduler 170 starts the next cycle at step 510.

What is claimed is:

1. A system for retrieving blocks of data from a storage medium and supplying the blocks in the form of a plurality of streams to users, wherein a stream of a first class of the streams may have an actual bit rate between a first minimum bit rate and a first maximum bit rate, wherein a stream of a second class of the streams may have an actual bit rate between a second minimum bit rate and a second maximum bit rate, and wherein the first maximum bit rate is substantially higher than the second maximum bit rate, the system comprising:

for each stream an associated buffer for storing the blocks of data; a reader for sweep reading a data block from the storage medium for each stream of a selected group of the streams and for storing the read blocks in the respective buffers; and a scheduler for repeatedly selecting the group of the streams for which a block is to be read in a next sweep of the reader, wherein the scheduler is operative to select a stream of the second class less often in the group for which a block is to be read than a stream of the first class.

2. A system as claimed in claim 1, wherein the scheduler is operative to select a particular stream of the second class in the group for which a block is to be read once every k sweeps, k being dependent on the first maximum consumption rate and the second maximum consumption rate.

3. A system as claimed in claim 1 with m streams of the second class, wherein the scheduler is operative to select the m streams in the group for which a block is to be read in one particular sweep.

4. A system as claimed in claim 2 with m streams of the second class, wherein the scheduler is operative to select a particular fraction m/k of the m streams in the group for which a block is to be read in one particular sweep, so as to evenly distribute selecting of the streams of the second class over the sweeps.

5. A method of retrieving blocks of data, such as audio and/or video, from a storage medium and supplying the blocks in the form of a plurality of streams to users, wherein a stream of a first class of the streams may have an actual bit rate between a first minimum bit rate and a first maximum bit rate, wherein a stream of a second class of the streams may have an actual bit rate between a second minimum bit rate and a second maximum bit rate, and wherein the first maximum bit rate is substantially higher than the second maximum bit rate, the method comprising the steps of:

for each stream storing the blocks of data in an associated buffer; sweep reading a data block from the storage medium for each stream of a selected group of the streams and storing the read blocks in the respective buffers; and repeatedly selecting the group of the streams for which a block is to be read in a next sweep, wherein a stream of the second class is selected less often in the group for which a block is to be read than a stream of the first class.

* * * * *

UNITED STATES PATENT AND TRADEMARK OFFICE
CERTIFICATE OF CORRECTION

| | | |
|---|---|---|
| PATENT NO. | : 6,477,541 B1 | |
| APPLICATION NO. | : 09/531943 | |
| DATED | : November 5, 2002 | |
| INVENTOR(S) | : Johannes H. M. Korst et al. | |

It is certified that error appears in the above-identified patent and that said Letters Patent is hereby corrected as shown below:

On Title page, Item 54 and Col. 1, line 1, "MULTIMEDIA SERVER" should read --METHOD AND SYSTEM FOR RETRIEVING DATA AND TRANSMITTING DATA STREAMS--.

Signed and Sealed this

Thirty-first Day of January, 2012

David J. Kappos
*Director of the United States Patent and Trademark Office*